(12) United States Patent
Suzuki

(10) Patent No.: US 6,423,413 B1
(45) Date of Patent: Jul. 23, 2002

(54) RADIATION IMAGE STORAGE PANEL

(75) Inventor: Hideki Suzuki, Kaisei-machi (JP)

(73) Assignee: Fuji Photo Film Co., Ltd., Kanagawa-Ken (JP)

(*) Notice: Subject to any disclaimer, the term of this patent is extended or adjusted under 35 U.S.C. 154(b) by 15 days.

(21) Appl. No.: 09/618,452

(22) Filed: Jul. 18, 2000

(30) Foreign Application Priority Data

Jul. 28, 1999 (JP) .......................................... 11-213058

(51) Int. Cl.$^7$ ................................................ B32B 27/40
(52) U.S. Cl. ................................ 428/423.3; 428/425.9; 428/551; 427/160
(58) Field of Search ................................ 428/548, 551, 428/423.1, 423.3, 425.9; 427/160

(56) References Cited

U.S. PATENT DOCUMENTS 5,591,982 A    1/1997  Kohda
5,866,266 A *  2/1999  Takasu ........................ 428/690

\* cited by examiner

*Primary Examiner*—James J. Seidlack
*Assistant Examiner*—Melanie Bissett

(57) ABSTRACT

A stimulable phosphor layer composed of a plurality of stimulable phosphor sublayers overlaid one upon another is overlaid upon a substrate. At least two adjacent stimulable phosphor sublayers are overlaid one upon the other such that a temporary substrate contact side surface of one of the two adjacent stimulable phosphor sublayers, which surface was in contact with a temporary substrate utilized when the one adjacent stimulable phosphor sublayer was formed, and a temporary substrate contact side surface of the other adjacent stimulable phosphor sublayer, which surface was in contact with a temporary substrate, stand facing each other. A top stimulable phosphor sublayer contains a polyurethane binder, which has a weight-average molecular weight falling within the range of 200,000 to 500,000, in a proportion falling within the range of 20% by weight to 90% by weight with respect to the total binder contained in the top stimulable phosphor sublayer.

8 Claims, 1 Drawing Sheet

RADIATION IMAGE STORAGE PANEL

BACKGROUND OF THE INVENTION

1. Field of the Invention

This invention relates to a radiation image storage panel utilizing light emission characteristics of a stimulable phosphor.

2. Description of the Related Art

In lieu of conventional radiography, radiation image recording and reproducing techniques utilizing a stimulable phosphor have heretofore been used in practice. The radiation image recording and reproducing techniques are described in, for example, U.S. Pat. No. 4,239,968. The radiation image recording and reproducing techniques utilizes a radiation image storage panel (referred to also as the stimulable phosphor sheet) provided with a stimulable phosphor. With the radiation image recording and reproducing techniques, the stimulable phosphor of the radiation image storage panel is caused to absorb radiation, which carries image information of an object or which has been radiated out from a sample, and thereafter the stimulable phosphor is exposed to an electromagnetic wave (stimulating rays), such as visible light or infrared rays, which causes the stimulable phosphor to produce the fluorescence (i.e., to emit light) in proportion to the amount of energy stored thereon during its exposure to the radiation. The produced fluorescence (the emitted light) is photoelectrically detected to obtain an electric signal. The electric signal is then processed, and the processed electric signal is utilized for reproducing a visible image.

The radiation image recording and reproducing techniques have the advantages in that a radiation image containing a large amount of information can be obtained with a markedly lower dose of radiation than in the conventional radiography. Also, ordinarily, the radiation image recording and reproducing techniques are performed with built-in types of radiation image recording and read-out apparatuses comprising, built in a single apparatus, (a) means (recording means) for irradiating radiation, which carries image information, to the radiation image storage panel and thereby recording a radiation image on the radiation image storage panel, (b) means (read-out means) for exposing the radiation image storage panel, on which the radiation image has been stored, to the stimulating rays, which cause the radiation image storage panel to emit light in proportion to the amount of energy stored thereon during its exposure to the radiation, and photoelectrically detecting the emitted light to obtain an electric signal (an image signal), (c) means (erasing means) for irradiating erasing light to the radiation image storage panel, from which the image signal has been detected, and thereby erasing information remaining on the radiation image storage panel, and (d) a conveyance system, which connect the recording means, the read-out means, and the erasing means to one another and conveys the radiation image storage panel among them. The erased radiation image storage panel can be used again for the recording of a radiation image. Therefore, the radiation image storage panel is used repeatedly. Particularly, in the radiation image recording and read-out apparatuses described above, the radiation image storage panel is conveyed repeatedly, circulated, and used for the recording of a radiation image within the apparatus. Accordingly, the radiation image recording and reproducing techniques is efficient particularly for direct medical radiography, such as the X-ray image recording for medical diagnosis.

Ordinarily, the radiation image storage panel utilized for the radiation image recording and reproducing techniques has a basic structure comprising a substrate and a stimulable phosphor layer overlaid on one surface of the substrate. Ordinarily, the radiation image storage panel has a rectangular sheet-like shape. Also, ordinarily, a transparent protective film is formed on the surface of the stimulable phosphor layer, which surface is opposite to the surface that stands facing the substrate. The transparent protective layer protects the stimulable phosphor layer from chemical deterioration or physical shocks.

The stimulable phosphor layer comprises a binder and stimulable phosphor particles dispersed in the binder. The stimulable phosphor has the properties such that, when the stimulable phosphor is caused to absorb radiation, such as X-rays, and is then exposed to an electromagnetic wave (stimulating rays), such as visible light or infrared rays, the stimulable phosphor emits light in proportion to the amount of energy stored thereon during its exposure to the radiation. Therefore, when the radiation image storage panel is exposed to the radiation, which carries image information of an object or which has been radiated out from a sample, the stimulable phosphor layer of the radiation image storage panel absorbs the radiation in proportion to the dose of radiation, and a radiation image of the object or the sample is stored as an image (a latent image) of energy from the radiation on the radiation image storage panel. The radiation image storage panel is then exposed to the electromagnetic wave, and the image having been stored on the radiation image storage panel can be detected as the light emitted by the radiation image storage panel. The emitted light is detected photoelectrically to obtain an image signal, the image signal is processed, and the thus obtained processed image signal can then be utilized for reproducing the radiation image of the object or the sample as a visible image.

As described above, the radiation image recording and reproducing techniques are the advantageous image forming techniques. However, as in the cases of an intensifying screen employed in the conventional radiography, it is desired that the radiation image storage panel utilized for the radiation image recording and reproducing techniques has a high sensitivity and can yield an image of good image quality (with respect to sharpness, graininess, and the like).

It is described in, for example, U.S. Pat. No. 4,346,295 and Japanese Unexamined Patent Publication No. 59(1984)-162499, that a radiation image storage panel capable of yielding an image of good image quality can be obtained by altering the ratio of a binder and a stimulable phosphor to each other with respect to the depth direction of the radiation image storage panel. Also, as a radiation image storage panel suitable for a technique for detecting light emitted from opposite surfaces of a radiation image storage panel and thereby detecting two image signals from the opposite surfaces of the radiation image storage panel, a radiation image storage panel has been proposed in, for example, Japanese Unexamined Patent Publication No. 7(1995)-287099, wherein the distribution of a binder and the distribution of ultramarine in a stimulable phosphor layer are biased to one side of the stimulable phosphor layer, such that the sharpness and graininess characteristics of an obtained radiation image may be improved.

As one of producing processes for obtaining the distribution described above, a producing process has been known, wherein a stimulable phosphor sublayer is formed on a temporary substrate having been applied with a releasing agent and is then separated from the temporary substrate, and a plurality of stimulable phosphor sublayers having thus been obtained are overlaid one upon another to form a stimulable phosphor layer. With the producing process, such that an image having good image quality can be obtained, a temporary substrate contact side surface of a stimulable phosphor sublayer, which surface was in contact with the temporary substrate when the stimulable phosphor sublayer was formed on the temporary substrate, and a temporary substrate contact side surface of an adjacent stimulable phosphor sublayer are adhered to each other. However, when the stimulable phosphor sublayer is formed on the temporary substrate, stimulable phosphor particles having a large specific gravity sink to the lower side, and the binder floats to the upper surface of the stimulable phosphor sublayer. As a result, at the temporary substrate contact side surface of the stimulable phosphor sublayer, the proportion of the binder becomes low. Therefore, when a plurality of stimulable phosphor sublayers are overlaid one upon another to form a stimulable phosphor layer, if the temporary substrate contact side surfaces of the stimulable phosphor sublayers, at which surfaces the proportions of the binder are low, are adhered to each other, the strength of adhesion between the stimulable phosphor sublayers will become low. Therefore, the problems occur in that, when the radiation image storage panel is conveyed repeatedly, the stimulable phosphor sublayers become separated from one another. Also, the problems occur in that the structure mottle characteristics become bad due to disturbance of the adhesion interface.

SUMMARY OF THE INVENTION

The primary object of the present invention is to provide a radiation image storage panel, which is provided with a stimulable phosphor layer composed of a plurality of stimulable phosphor sublayers overlaid one upon another, such that a sufficient adhesion strength may be obtained between the stimulable phosphor sublayers and disturbance at the stimulable phosphor sublayer interface may be suppressed, and which yields an image having good image quality and has good conveyance durability.

The present invention provides a radiation image storage panel, comprising at least a substrate and a stimulable phosphor layer overlaid upon the substrate, the stimulable phosphor layer being composed of a plurality of stimulable phosphor sublayers overlaid one upon another, wherein at least two stimulable phosphor sublayers, which are adjacent to each other among the plurality of the stimulable phosphor sublayers overlaid one upon another, are overlaid one upon the other such that a temporary substrate contact side surface of one of the two adjacent stimulable phosphor sublayers, which surface was in contact with a temporary substrate utilized when the one adjacent stimulable phosphor sublayer was formed, and a temporary substrate contact side surface of the other adjacent stimulable phosphor sublayer, which surface was in contact with a temporary substrate utilized when the other adjacent stimulable phosphor sublayer was formed, stand facing each other, and wherein a binder, which is contained in a top stimulable phosphor sublayer that is remotest from the substrate among the plurality of the stimulable phosphor sublayers overlaid one upon another on the substrate, contains a polyurethane binder, which has a weight-average molecular weight falling within the range of 200,000 to 500,000, in a proportion falling within the range of 20% by weight to 90% by weight with respect to the total binder contained in the top stimulable phosphor sublayer.

The polyurethane binder is a high-molecular weight compound having a urethane bond, —NHCOO—, in the repeating unit in the main chain. The polyurethane binder employed in the radiation image storage panel in accordance with the present invention has a weight-average molecular weight falling within the range of 200,000 to 500,000, and should preferably have a weight-average molecular weight falling within the range of 250,000 to 400,000. The polyurethane binder is contained in the top stimulable phosphor sublayer among the plurality of the stimulable phosphor sublayers overlaid one upon another on the substrate, i.e. in the stimulable phosphor sublayer which is remotest from the substrate. The proportion of the polyurethane binder contained in the top stimulable phosphor sublayer falls within the range of 20% by weight to 90% by weight with respect to the total binder contained in the top stimulable phosphor sublayer, and should preferably fall within the range of 40% by weight to 80% by weight with respect to the total binder contained in the top stimulable phosphor sublayer.

For example, in cases where the number of the stimulable phosphor sublayers overlaid on the substrate is two, the two stimulable phosphor sublayers are overlaid one upon the other such that the temporary substrate contact side surface of one of the two stimulable phosphor sublayers, which surface was in contact with the temporary substrate utilized when the one stimulable phosphor sublayer was formed, and the temporary substrate contact side surface of the other stimulable phosphor sublayer, which surface was in contact with the temporary substrate utilized when the other stimulable phosphor sublayer was formed, stand facing each other. Also, the binder, which is contained in the top stimulable phosphor sublayer that is remoter from the substrate than the other stimulable phosphor sublayer is, contains the polyurethane binder, which has a weight-average molecular weight falling within the range of 200,000 to 500,000, in a proportion falling within the range of 20% by weight to 90% by weight with respect to the total binder contained in the top stimulable phosphor sublayer. In cases where the number of the stimulable phosphor sublayers overlaid on the substrate is three, two stimulable phosphor sublayers among the three stimulable phosphor sublayers should preferably be overlaid one upon the other such that the temporary substrate contact side surface of one of the two stimulable phosphor sublayers, which surface was in contact with the temporary substrate utilized when the one stimulable phosphor sublayer was formed, and the temporary substrate contact side surface of the other stimulable phosphor sublayer, which surface was in contact with the temporary substrate utilized when the other stimulable phosphor sublayer was formed, stand facing each other. The two stimulable phosphor sublayers are overlaid upon the substrate. Also, in such cases, a top stimulable phosphor sublayer containing the polyurethane binder, which has a weight-average molecular weight falling within the range of 200,000 to 500,000, in a proportion falling within the range of 20% by weight to 90% by weight with respect to the total binder contained in the top stimulable phosphor sublayer should preferably be overlaid upon the two stimulable phosphor sublayers, which have been overlaid upon the substrate in the manner described above.

In the radiation image storage panel in accordance with the present invention, sublayer thickness of each of the stimulable phosphor sublayers overlaid one upon another on the substrate should preferably be set such that the sublayer thickness of a stimulable phosphor sublayer remote from the substrate is smaller than the sublayer thickness of a stimulable phosphor sublayer close to the substrate.

As described above, the radiation image storage panel in accordance with the present invention comprises at least the substrate and the stimulable phosphor layer overlaid upon the substrate, the stimulable phosphor layer being composed of a plurality of stimulable phosphor sublayers overlaid one upon another. At least two stimulable phosphor sublayers, which are adjacent to each other among the plurality of the stimulable phosphor sublayers overlaid one upon another, are overlaid one upon the other such that the temporary substrate contact side surface of one of the two adjacent stimulable phosphor sublayers, which surface was in contact with the temporary substrate utilized when the one adjacent stimulable phosphor sublayer was formed, and the temporary substrate contact side surface of the other adjacent stimulable phosphor sublayer, which surface was in contact with the temporary substrate utilized when the other adjacent stimulable phosphor sublayer was formed, stand facing each other. Therefore, the radiation image storage panel in accordance with the present invention has a high permeability to light and can yield an image having good image quality with respect to sharpness and graininess. Also, ordinarily, when a stimulable phosphor sublayer is formed on a temporary substrate, stimulable phosphor particles having a large specific gravity sink to the lower side (the substrate side), and a binder floats to the upper surface of the stimulable phosphor sublayer. However, with the radiation image storage panel in accordance with the present invention, the binder, which is contained in the top stimulable phosphor sublayer that is remotest from the substrate among the plurality of the stimulable phosphor sublayers overlaid one upon another on the substrate, contains the polyurethane binder, which has a weight-average molecular weight falling within the range of 200,000 to 500,000, in a proportion falling within the range of 20% by weight to 90% by weight with respect to the total binder contained in the top stimulable phosphor sublayer. Therefore, when the top stimulable phosphor sublayer is formed on the temporary substrate, the binder does not readily float to the upper surface of the stimulable phosphor sublayer. Therefore, the adhesion strength between the top stimulable phosphor sublayer and the stimulable phosphor sublayer lying under the top stimulable phosphor sublayer can be enhanced, and the stimulable phosphor layer having a high resistance to sublayer separation can be obtained. Accordingly, the radiation image storage panel having an enhanced conveyance durability can be obtained. Specifically, an ordinary stimulable phosphor sublayer has a biased binder distribution such that, when the temporary substrate contact side surface of the stimulable phosphor sublayer, which surface was in contact with the temporary substrate when the stimulable phosphor sublayer was formed on the temporary substrate, and the opposite upper surface of the stimulable phosphor sublayer, which surface was not in contact with the temporary substrate when the stimulable phosphor sublayer was formed on the temporary substrate, are compared with each other, more of the binder is contained at the opposite upper surface, and less of the binder is contained at the temporary substrate contact side surface. However, with the radiation image storage panel in accordance with the present invention, wherein the binder, which is contained in the top stimulable phosphor sublayer that is remotest from the substrate among the plurality of the stimulable phosphor sublayers overlaid one upon another on the substrate, contains the polyurethane binder, which has a weight-average molecular weight falling within the range of 200,000 to 500,000, in a proportion falling within the range of 20% by weight to 90% by weight with respect to the total binder contained in the top stimulable phosphor sublayer, the top stimulable phosphor sublayer has little difference in binder distribution between the temporary substrate contact side surface and the opposite upper surface of the top stimulable phosphor sublayer. Therefore, the adhesion strength between the top stimulable phosphor sublayer and the adjacent stimulable phosphor sublayer can be enhanced markedly. Also, since the adhesion strength between adjacent stimulable phosphor sublayers can be enhanced, disturbance of the adhesion interface can be suppressed, and the problems can be prevented from occurring in that the structure mottle characteristics become bad due to disturbance of the adhesion interface.

With the radiation image storage panel in accordance with the present invention, wherein the proportion of the polyurethane binder contained in the top stimulable phosphor sublayer falls within the range of 40% by weight to 80% by weight with respect to the total binder contained in the top stimulable phosphor sublayer, the effects described above can be enhanced even further.

With the radiation image storage panel in accordance with the present invention, the sublayer thickness of each of the stimulable phosphor sublayers overlaid one upon another on the substrate may be set such that the sublayer thickness of a stimulable phosphor sublayer remote from the substrate is smaller than the sublayer thickness of a stimulable phosphor sublayer close to the substrate. Specifically, the thickness of the top stimulable phosphor sublayer, which is remotest from the substrate among the plurality of the stimulable phosphor sublayers overlaid one upon another on the substrate and which contains the polyurethane binder having a weight-average molecular weight falling within the range of 200,000 to 500,000 in a proportion falling within the range of 20% by weight to 90% by weight with respect to the total binder contained in the top stimulable phosphor sublayer, may be set to be thin. In such cases, the difference in binder distribution between the temporary substrate contact side surface and the opposite upper surface of the top stimulable phosphor sublayer can be minimized, and the image quality of the image obtained with the radiation image storage panel can be enhanced even further.

The present invention will hereinbelow be described in further detail with reference to the accompanying drawings.

DETAILED DESCRIPTION OF THE INVENTION

Figure 1:
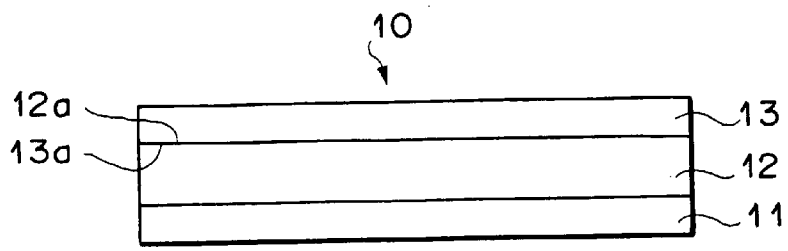
FIG. 1 is an explanatory view showing an embodiment of the radiation image storage panel in accordance with the present invention.

The radiation image storage panel utilizes a stimulable phosphor. The stimulable phosphor has the properties such that, when the stimulable phosphor is caused to absorb radiation and is then exposed to stimulating rays, the stimulable phosphor emits light in proportion to the amount of energy stored thereon during its exposure to the radiation. From the practical aspect, the stimulable phosphor should preferably have the characteristics such that, when the stimulable phosphor is exposed to the stimulating rays having wavelengths falling within the range of 400 nm to 900 nm, the stimulable phosphor emits light having wavelengths falling within the range of 300 nm to 500 nm. By way of example, the stimulable phosphor may be selected from the following stimulable phosphors:

a phosphor represented by the formula SrS:Ce,Sm; SrS:Eu,Sm; ThO$_2$:Er; or La$_2$O$_2$S:Eu,Sm, as described in U.S. Pat. No. 3,859,527, a phosphor represented by the formula ZnS:Cu,Pb; BaO.xAl$_2$O$_3$: Eu wherein $0.8 \leq x \leq 10$; M$^{II}$O.xSiO$_2$: A wherein M$^{II}$, is Mg, Ca, Sr, Zn, Cd, or Ba, A is Ce, Tb, Eu, Tm, Pb, Tl, Bi, or Mn, and x is a number satisfying $0.5 \leq x \leq 2.5$; or LnOX:xA wherein Ln is at least one of La, Y, Gd, and Lu, X is at least one of Cl and Br, A is at least one of Ce and Tb, x is a number satisfying $0<x<0.1$, as disclosed in U.S. Pat. No. 4,236,078, a phosphor represented by the formula $(B_{1-x-y},Mg_x,Ca_y)$FX:aEu$^{2+}$ wherein X is at least one of Cl and Br, x and y are numbers satisfying $0<x+y\leq 0.6$ and $xy \neq 0$, and a is a number satisfying $10^{-6} \leq a \leq 5 \times 10^{-2}$, as disclosed in DE-OS No. 2,928,245, a phosphor represented by the formula $(Ba_{1-x},M^{2+}_x)$FX:yA wherein M$^{2+}$ is at least one of Mg, Ca, Sr, Zn, and Cd, X is at least one of Cl, Br, and I, A is at least one of Eu, Tb, Ce, Tm, Dy, Pr, Ho, Nd, Yb, and Er, x is a number satisfying $0 \leq x \leq 0.6$, and y is a number satisfying $0 \leq y \leq 0.2$, as disclosed in U.S. Pat. No. 4,239,968, a phosphor represented by the formula M$^{II}$FX.xA:yLn wherein M$^{II}$ is at least one of Ba, Ca, Sr, Mg, Zn, and Cd, A is at least one of BeO, MgO, CaO, SrO, BaO, ZnO, Al$_2$O$_3$, Y$_2$O$_3$, La$_2$O$_3$, In$_2$O$_3$, SiO$_2$, TiO$_2$, ZrO$_2$, GeO$_2$, SnO$_2$, Nb$_2$O$_5$, Ta$_2$O$_5$, and ThO$_2$, Ln is at least one of Eu, Tb, Ce, Tm, Dy, Pr, Ho, Nd, Yb, Er, Sm, and Gd, X is at least one of Cl, Br, and I, x is a number satisfying $5 \times 10^{-5} \leq x \leq 0.5$, and y is a number satisfying $0<y \leq 0.2$, as described in Japanese Unexamined Patent Publication No. 55(1980)-160078, a phosphor represented by the formula $(Ba_{1-x},M^{II}_x)F_2$.aBaX$_2$:yEu,zA wherein M$^{II}$ is at least one of beryllium, magnesium, calcium, strontium, zinc, and cadmium, X is at least one of chlorine, bromine, and iodine, A is at least one of zirconium and scandium, a is a number satisfying $0.5 \leq a \leq 1.25$, x is a number satisfying $0 \leq x \leq 1$, y is a number satisfying $10^{-6} \leq y \leq 2 \times 10^{-1}$, and z is a number satisfying $0<z \leq 10^{-2}$, as described in Japanese Unexamined Patent Publication No. 56(1981)-116777, a phosphor represented by the formula $(Ba_{1-x},M^{II}_x)F_2$.aBaX$_2$:yEu,zB wherein M$^{II}$ is at least one of beryllium, magnesium, calcium, strontium, zinc, and cadmium, X is at least one of chlorine, bromine, and iodine, a is a number satisfying $0.5 \leq a \leq 1.25$, x is a number satisfying $0 \leq x \leq 1$, y is a number satisfying $10^{-6} \leq y \leq 2 \times 10^{-1}$, and z is a number satisfying $0<z<2 \times 10^{-1}$, as described in Japanese Unexamined Patent Publication No. 57(1982)-23673, a phosphor represented by the formula $(Ba_{1-x},M^{II}_x)F_2$.aBaX$_2$:yEu,zA wherein M$^{II}$ is at least one of beryllium, magnesium, calcium, strontium, zinc, and cadmium, X is at least one of chlorine, bromine, and iodine, A is at least one of arsenic and silicon, a is a number satisfying $0.5 \leq a \leq 1.25$, x is a number satisfying $0 \leq x \leq 1$, y is a number satisfying $10^{-6} \leq y \leq 2 \times 10^{-1}$, and z is a number satisfying $0<z \leq 5 \times 10^{-1}$, as described in Japanese Unexamined Patent Publication No. 57(1982)-23675, a phosphor represented by the formula M$^{III}$OX: xCe wherein M$^{III}$ is at least one trivalent metal selected from the group consisting of Pr, Nd, Pm, Sm, Eu, Tb, Dy, Ho, Er, Tm, Yb, and Bi, X is either one or both of Cl and Br, and x is a number satisfying $0<x<0.1$, as described in Japanese Unexamined Patent Publication No. 58(1983)-69281, a phosphor represented by the formula $Ba_{1-x}M_{x/2}L_{x/2}$FX:yEu$^{2+}$ wherein M is at least one alkaline metal selected from the group consisting of Li, Na, K, Rb, and Cs, L is at least one trivalent metal selected from the group consisting of Sc, Y, La, Ce, Pr, Nd, Pm, Sm, Gd, Tb, Dy, Ho, Er, Tm, Yb, Lu, Al, Ga, In, and Tl, X is at least one halogen selected from the group consisting of Cl, Br, and I, x is a number satisfying $10^{-2} \leq x \leq 0.5$, and y is a number satisfying $0<y \leq 0.1$, as described in Japanese Unexamined Patent Publication No. 58(1983)-206678, a phosphor represented by the formula BaFX.xA:yEu$^{2+}$ wherein X is at least one halogen selected from the group consisting of Cl, Br, and I, A is a calcination product of a tetrafluoroboric acid compound, x is a number satisfying $10^{-6} \leq x \leq 0.1$, and y is a number satisfying $0<y \leq 0.1$, as described in Japanese Unexamined Patent Publication No. 59(1984)-27980, a phosphor represented by the formula BaFX.xA:yEu$^{2+}$ wherein X is at least one halogen selected from the group consisting of Cl, Br, and I, A is a calcination product of at least one compound selected from the hexafluoro compound group consisting of salts of hexafluorosilicic acid, hexafluorotitanic acid, and hexafluorozirconic acid with monovalent or bivalent metals, x is a number satisfying $10^{-6} \leq x \leq 0.1$, and y is a number satisfying $0<y \leq 0.1$, as described in Japanese Unexamined Patent Publication No. 59(1984)-47289, a phosphor represented by the formula BaFX.xNaX':aEu$^{2+}$ wherein each of X and X' is at least one of Cl, Br, and I, x is a number satisfying $0<x \leq 2$, and a is a number satisfying $0<a \leq 0.2$, as described in Japanese Unexamined Patent Publication No. 59(1984)-56479, a phosphor represented by the formula M$^{II}$FX.xNaX':yEu$^{2+}$:zA wherein M$^{II}$ is at least one alkaline earth metal selected from the group consisting of Ba, Sr, and Ca, each of X and X' is at least one halogen selected from the group consisting of Cl, Br, and I, A is at least one transition metal selected from the group consisting of V, Cr, Mn, Fe, Co, and Ni, x is a number satisfying $0<x \leq 2$, y is a number satisfying $0<y \leq 0.2$, and z is a number satisfying $0<z \leq 10^{-2}$, as described in Japanese Unexamined Patent Publication No. 59(1984)-56480, a phosphor represented by the formula M$^{II}$FX.aM$^{I}$X'.bM$^{II}$X''$_2$.cM$^{III}$X'''$_3$. xA:yEu$^{2+}$ wherein M$^{II}$ is at least one alkaline earth metal selected from the group consisting of Ba, Sr, and Ca, M$^{I}$ is at least one alkali metal selected from the group consisting of Li, Na, K, Rb, and Cs, M$^{II}$ is at least one bivalent metal selected from the group consisting of Be and Mg, M$^{III}$ is at least one trivalent metal selected from the group consisting of Al, Ga, In, and Tl, A is a metal oxide, X is at least one halogen selected from the group consisting of Cl, Br, and I, each of X', X'', and X''' is at least one halogen selected from the group consisting of F, Cl, Br, and I, a is a number satisfying $0 \leq a \leq 2$, b is a number satisfying $0 \leq b \leq 10^{-2}$, c is a number satisfying $0 \leq c \leq 10^{-2}$, and $a+b+c \geq 10^{-6}$, x is a number satisfying $0<x \leq 0.5$, and y is a number satisfying $0<y \leq 0.2$, as described in Japanese Unexamined Patent Publication No. 59(1984)-75200, a stimulable phosphor represented by the formula $M^{II}X_2 \cdot aM^{II}X'_2:xEu^{2+}$ wherein $M^{II}$ is at least one alkaline earth metal selected from the group consisting of Ba, Sr, and Ca, each of X and X' is at least one halogen selected from the group consisting of Cl, Br, and I, and $X \neq X'$, a is a number satisfying $0.1 \leq a \leq 10.0$, and x is a number satisfying $0<x \leq 0.2$, as described in Japanese Unexamined Patent Publication No. 60(1985)-84381, a stimulable phosphor represented by the formula $M^{II}FX \cdot aM^{I}X':xEu^{2+}$ wherein $M^{II}$ is at least one alkaline earth metal selected from the group consisting of Ba, Sr, and Ca, $M^{I}$ is at least one alkali metal selected from the group consisting of Rb and Cs, X is at least one halogen selected from the group consisting of Cl, Br, and I, X' is at least one halogen selected from the group consisting of F, Cl, Br, and I, a is a number satisfying $0 \leq a \leq 4.0$, and x is a number satisfying $0<x \leq 0.2$, as described in Japanese Unexamined Patent Publication No. 60(1985)-101173, a stimulable phosphor represented by the formula $M^{I}X:xBi$ wherein $M^{I}$ is at least one alkali metal selected from the group consisting of Rb and Cs, X is at least one halogen selected from the group consisting of Cl, Br, and I, and x is a number falling within the range of $0<x \leq 0.2$, as described in Japanese Unexamined Patent Publication No. 62(1987)-25189, and cerium activated rare earth element oxyhalide phosphor represented by the formula LnOX:xCe wherein Ln is at least one of La, Y, Gd, and Lu, X is at least one of Cl, Br, and I, x is a number satisfying $0<x \leq 0.2$, the ratio of X to Ln, expressed in terms of the atomic ratio, falls within the range of $0.500<X/Ln \leq 0.998$, and the maximum wavelength k of the stimulation spectrum falls within the range of 550 nm$<\lambda<$700 nm, as described in Japanese Unexamined Patent Publication No. 2(1990)-229882.

The stimulable phosphor represented by the formula $M^{II}X_2 \cdot aM^{II}X'_2:xEu^{2+}$, which is described in Japanese Unexamined Patent Publication No. 60(1985)-84381, may contain the additives described below in the below-mentioned proportions per mol of $M^{II}X_2 \cdot aM^{II}X'_2$:

b'X" wherein $M^{I}$ is at least one alkali metal selected from the group consisting of Rb and Cs, X" is at least one halogen selected from the group consisting of F, Cl, Br, and I, and b is a number satisfying $0<b \leq 10.0$, as described in Japanese Unexamined Patent Publication No. 60(1985)-166379, bKX".cMgX"'$_2$.dM$^{III}$X""$_3$ wherein $M^{III}$ is at least one trivalent metal selected from the group consisting of Sc, Y, La, Gd, and Lu, each of X", X"', and X"", is at least one halogen selected from the group consisting of F, Cl, Br, and I, b is a number satisfying $0 \leq b \leq 2.0$, c is a number satisfying $0 \leq c \leq 2.0$, d is a number satisfying $0 \leq d \leq 2.0$, and $2 \times 10^{-5} \leq b+c+d$, as described in Japanese Unexamined Patent Publication No. 60(1985)-221483, yB wherein y is a number satisfying $2 \times 10^{-4} \leq y \leq 2 \times 10^{-1}$, as described in Japanese Unexamined Patent Publication No. 60(1985)-228592, bA wherein A is at least one oxide selected from the group consisting of $SiO_2$ and $P_2O_5$, and b is a number satisfying $10^{-4} \leq b \leq 2 \times 10^{-1}$, as described in Japanese Unexamined Patent Publication No. 60(1985)-228593, bSiO wherein b is a number satisfying $0<b \leq 3 \times 10^{-2}$, as described in Japanese Unexamined Patent Publication No. 61(1986)-120883, bSnX"$_2$ wherein X" is at least one halogen selected from the group consisting of F, Cl, Br, and I, and b is a number satisfying $0<b \leq 10^{-3}$, as described in Japanese Unexamined Patent Publication No. 61(1986)-120885, bCsX".cSnX"'$_2$ wherein each of X" and X"' is at least one halogen selected from the group consisting of F, Cl, Br, and I, b is a number satisfying $0<b \leq 10.0$, and c is a number satisfying $10^{-6} \leq c \leq 2 \times 10^{-2}$, as described in Japanese Unexamined Patent Publication No. 61(1986)-235486, and bCsX".yLn$^{3+}$ wherein X" is at least one halogen selected from the group consisting of F, Cl, Br, and I, Ln is at least one rare earth element selected from the group consisting of Sc, Y, Ce, Pr, Nd, Sm, Gd, Tb, Dy, Ho, Er, Tm, Yb, and Lu, b is a number satisfying $0<b \leq 10.0$, and y is a number satisfying $10^{-6} \leq y \leq 1.8 \times 10^{-1}$, as described in Japanese Unexamined Patent Publication No. 61(1986)-235487.

Also, the following stimulable phosphor can be utilized advantageously:

a cerium activated barium fluorohalide phosphor represented by Formula (I):

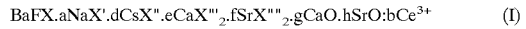

$$BaFX \cdot aNaX' \cdot dCsX'' \cdot eCaX'''_2 \cdot fSrX''''_2 \cdot gCaO \cdot hSrO:bCe^{3+} \quad (I)$$

wherein X is at least one halogen selected from the group consisting of Cl, Br, and I, X' is Br and/or I, each of X", X"', and X"" is at least one halogen selected from the group consisting of F, Cl, Br, and I, each of a, d, e, f, g, and h is a number satisfying the conditions $10^{-4} \leq a+d+e+f+g+h \leq 10^{-1}$, and b is a number falling within the range of $10^{-5} \leq b \leq 10^{-2}$, as described in Japanese Patent Application No. 4(1992)-276540.

In particular, the following stimulable phosphor can be utilized advantageously:

a cerium activated barium fluorohalide phosphor represented by Formula (II):

$$BaFX \cdot aNaX':bCe^{3+} \quad (II)$$

wherein X is at least one halogen selected from the group consisting of Cl, Br, and I, X' is Br and/or I, a is a number falling within the range of $0<a \leq 10^{10-2}$, and b is a number falling within the range of $10^{-5} \leq b \leq 10^{-2}$, as described in Japanese Patent Application No. 4(1992)-276540.

Of the above-enumerated stimulable phosphors, the bivalent europium activated alkaline earth metal halide phosphor or the cerium activated alkaline earth metal halide phosphor, and the rare earth element-activated rare earth element oxyhalide phosphor, such as the cerium activated rare earth element oxyhalide phosphor, exhibit light emission with a high luminance and therefore are particularly preferable. However, the stimulable phosphor employed in the radiation image storage panel in accordance with the present invention is not limited to the phosphors enumerated above and may be one of various other phosphors, which has the properties such that, when the phosphor is caused to absorb radiation and is then exposed to stimulating rays, the phosphor emits light in proportion to the amount of energy stored thereon during its exposure to the radiation.

Examples of the binders other than the polyurethane binder, which binders may be employed in the stimulable phosphor layer of the radiation image storage panel in accordance with the present invention, include polymers, typically natural high-molecular weight substances, e.g., proteins, such as gelatin, and polysaccharides, such as dextran; and synthetic high-molecular weight substances, such as a polyvinyl butyral, a polyvinyl acetate, ethyl cellulose, a vinylidene chloride-vinyl chloride copolymer, a vinyl chloride-vinyl acetate copolymer, cellulose acetate butyrate, a polyvinyl alcohol, a linear polyester, a polystyrene, and an epoxy resin. Softness of the binders varies for different molecular structures, different molecular weights, and the like. Therefore, as the other binders, comparatively hard binders should preferably be selected. The other binders should more preferably selected from a polystyrene, an epoxy resin, and mixtures of the polystyrene or the epoxy resin and other polymers. The binders may have been subjected to crosslinking by the use of a crosslinking agent.

The stimulable phosphor layer can be formed with, for example, the technique described below. Specifically, the stimulable phosphor and the binder described above are added to an appropriate solvent and mixed together sufficiently. In this manner, a coating composition, in which stimulable phosphor particles have been dispersed or dissolved uniformly in the binder solution, is prepared. Examples of the solvents for the preparation of the coating composition include lower alcohols, such as methyl alcohol, ethyl alcohol, n-propyl alcohol, and n-butyl alcohol; chlorine atom-containing hydrocarbons, such as methylene chloride and ethylene chloride; ketones, such as acetone, methyl ethyl ketone, and methyl isopropyl ketone; esters of lower fatty acids with lower alcohols, such as methyl acetate, ethyl acetate, and butyl acetate; ethers, such as dioxane, ethylene glycol monoethyl ether, and ethylene glycol monomethyl ether; mixtures of two or more of the above-enumerated solvents.

The mixing ratio of the binder to the stimulable phosphor in the coating composition varies for different characteristics desired for the radiation image storage panel, different kinds of the stimulable phosphors, and the like. ordinarily, the mixing ratio of the binder to the stimulable phosphor is selected from the range between 1:1 and 1:100 (weight ratio). The mixing ratio of the binder to the stimulable phosphor should preferably be selected from the range between 1:8 and 1:40 (weight ratio), and should more preferably be selected from the range between 1:8 and 1:30 (weight ratio).

The coating composition may also contain various additives, such as a dispersing agent for enhancing the dispersibility of the stimulable phosphor particles in the coating composition, and a plasticizer for enhancing the binding force between the binder and the stimulable phosphor in the stimulable phosphor layer (or the stimulable phosphor sublayers) after being formed.

The coating composition, which contains the stimulable phosphor particles and the binder and has been prepared in the manner described above, is uniformly applied onto a surface of a temporary substrate having a flat surface. The temporary substrate may be constituted of a plastic sheet, a glass plate, a metal plate, or the like. In this manner, a coating film of the coating composition is formed. The operation for applying the coating composition onto the temporary substrate may be performed by utilizing ordinary coating means, such as a doctor blade, a roll coater, or a knife coater. Thereafter, the formed coating film is heated little by little and is thus dried, and the formation of a stimulable phosphor sublayer is completed. The layer thickness of the stimulable phosphor layer composed of a plurality of stimulable phosphor sublayers varies for different characteristics desired for the radiation image storage panel, different kinds of the stimulable phosphors, different mixing ratios of the binder to the stimulable phosphor, and the like. Ordinarily, the layer thickness of the stimulable phosphor layer is set at a value falling within the range of 20 $\mu$m to 1 mm. The layer thickness of the stimulable phosphor layer should preferably be set at a value falling within the range of 50 $\mu$m to 500 $\mu$m, and should more preferably be set at a value falling within the range of 100 $\mu$m to 400 $\mu$m. Therefore, the thickness of each stimulable phosphor sublayer is adjusted in accordance with the thickness of the stimulable phosphor layer and the number of the stimulable phosphor sublayers overlaid one upon another.

In the coating film having been formed from the coating composition in the manner described above, the stimulable phosphor particles having a large specific gravity sink to the lower side. Therefore, the weight ratio of the binder to the stimulable phosphor particles becomes smallest at the position in the vicinity of the bottom surface of the coating film (i.e., the temporary substrate contact side surface of the coating film) and becomes largest at the position in the vicinity of the opposite upper surface of the coating film. In cases where a coloring agent is contained in the coating composition, since the coloring agent particles have a specific gravity smaller than the specific gravity of the stimulable phosphor particles and are apt to move together with the binder in the coating layer, more of the coloring agent particles gathers at the position in the vicinity of the opposite upper surface of the coating film. Also, in cases where a dye capable of dissolving in the coating composition is employed as the coloring agent, more of the dye is distributed at the position in the vicinity of the opposite upper surface of the coating film together with the binder. The biased distributions of the stimulable phosphor particles, the binder, and the coloring agent are promoted in the drying step for removing the solvent from the coating film. Therefore, in the stimulable phosphor sublayer obtained by drying the coating film, the weight ratio of the binder to the stimulable phosphor particles becomes smallest at the position in the vicinity of the bottom surface of the stimulable phosphor sublayer, and more of the coloring agent is distributed at the position in the vicinity of the opposite upper surface of the stimulable phosphor sublayer.

Figure 2:
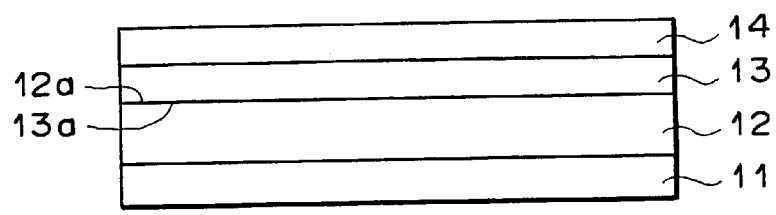
FIG. 2 is an explanatory view showing a different embodiment of the radiation image storage panel in accordance with the present invention.

The radiation image storage panel provided with the stimulable phosphor layer comprising a plurality of stimulable phosphor sublayers overlaid one upon another may be produced in the manner described below. Specifically, as illustrated in FIG. 1, in cases where the number of the stimulable phosphor sublayers overlaid on the substrate is two, two stimulable phosphor sublayers 12 and 13 are overlaid one upon the other on a substrate 11 such that a temporary substrate contact side surface 12a of the stimulable phosphor sublayer 12, which surface was in contact with the temporary substrate utilized when the stimulable phosphor sublayer 12 was formed, and a temporary substrate contact side surface 13a of the stimulable phosphor sublayer 13, which surface was in contact with the temporary substrate utilized when the stimulable phosphor sublayer 13 was formed, stand facing each other. Also, the binder, which is contained in the top stimulable phosphor sublayer 13 that is remoter from the substrate 11 than the other stimulable phosphor sublayer 12 is, contains the polyurethane binder, which has a weight-average molecular weight falling within the range of 200,000 to 500,000, in a proportion falling within the range of 20% by weight to 90% by weight with respect to the total binder contained in the top stimulable phosphor sublayer 13. As illustrated in FIG. 2, in cases where the number of the stimulable phosphor sublayers overlaid on the substrate is three, the two stimulable phosphor sublayers 12 and 13 among the three stimulable phosphor sublayers are overlaid one upon the other such that the temporary substrate contact side surface 12a of the stimulable phosphor sublayer 12, which surface was in contact with the temporary substrate utilized when the stimulable phosphor sublayer 12 was formed, and the temporary substrate contact side surface 13a of the stimulable phosphor sublayer 13, which surface was in contact with the temporary substrate utilized when the stimulable phosphor sublayer 13 was formed, stand facing each other. The two stimulable phosphor sublayers 12 and 13 are overlaid upon the substrate 11. Also, a top stimulable phosphor sublayer 14 is overlaid upon the stimulable phosphor sublayer 13. In such cases, the top stimulable phosphor sublayer 14 contains the polyurethane binder, which has a weight-average molecular weight falling within the range of 200,000 to 500,000, in a proportion falling within the range of 20% by weight to 90% by weight with respect to the total binder contained in the top stimulable phosphor sublayer 14. The sublayer thickness of each of the stimulable phosphor sublayers overlaid one upon another on the substrate 11 should preferably be set such that the sublayer thickness of a stimulable phosphor sublayer remote from the substrate 11 is smaller than the sublayer thickness of a stimulable phosphor sublayer close to the substrate 11. Specifically, as illustrated in FIG. 1, in cases where the two stimulable phosphor sublayers 12 and 13 are overlaid upon the substrate 11, the stimulable phosphor sublayer 13 should preferably be thinner than the stimulable phosphor sublayer 12. Also, as illustrated in FIG. 2, in cases where the three stimulable phosphor sublayers 12, 13, and 14 are overlaid upon the substrate 11, the stimulable phosphor sublayer 13 should preferably be thinner than the stimulable phosphor sublayer 12, and the stimulable phosphor sublayer 14 should preferably be thinner than the stimulable phosphor sublayer 13.

Ordinarily, the radiation image storage panel in accordance with the present invention is circulated and used repeatedly in a radiation image recording and read-out apparatus.

Therefore, a thin transparent plastic film layer having a thickness of at most 30 μm should preferably be overlaid on a stimulating ray irradiation side surface of the stimulable phosphor layer or on both of the stimulating ray irradiation side surface and the opposite surface of the stimulable phosphor layer. The transparent plastic film layer may be formed by applying a solution, which contains a transparent high-molecular weight substance in an appropriate solvent, onto the surface of the stimulable phosphor layer. Examples of the transparent high-molecular weight substances for forming the transparent plastic film layer include cellulose derivatives, such as cellulose acetate and nitrocellulose, and synthetic high-molecular weight substances, such as a polymethyl methacrylate, a polyvinyl butyral, a polyvinyl formal, a polycarbonate, a polyvinyl acetate, a vinyl chloride-vinyl acetate copolymer, and a fluoro olefin-vinyl ether copolymer. Alternatively, the transparent plastic film layer may be formed by, for example, adhering a transparent thin film, which has been formed from a polyethylene terephthalate, polyethylene naphthalate, a polyimide, a polycarbonate, a polyethylene, vinylidene chloride, a polyamide, or the like, to the surface of the stimulable phosphor layer by use of an appropriate adhesive agent. A transparent substrate for an ordinary radiation image storage panel may be overlaid on the surface which is not provided with the thin transparent plastic film.

The present invention will further be illustrated by the following non-limitative examples.

EXAMPLE A

A coating composition for forming stimulable phosphor sublayers was prepared in the manner described below. Specifically, 2,000 g of a stimulable phosphor (a tetradecahedral form phosphor represented by the formula $BaFBr_{0.85}I_{0.15}:Eu^{2+}$), 492 g of a binder [a solution containing a polyurethane elastomer (Pandex T-5265H (solid) 573 batch, having a weight-average molecular weight of 307,000, supplied by Dainippon Ink and Chemicals, Inc.) in methyl ethyl ketone and having a solid content concentration of 13% by weight and a viscosity of 9.3 Ps], 6 g of a crosslinking agent [a polyisocyanate; Coronate HX (solid content: 100%), supplied by Nippon Polyurethane K.K.], 30 g of an anti-yellowing agent [an epoxy resin; Epicoat #1001 (solid), supplied by Yuka Shell Epoxy K.K.], and 0. 5 g of a radical trapping agent (a phosphite type anti-oxidant; C, supplied by Asahi Denka Kogyo K.K.) were added to 186 g of methyl ethyl ketone acting as a solvent. The resulting mixture was subjected to a dispersing process, which was performed with a propeller mixer at 10,000 rpm for 30 minutes. In this manner, the coating composition (weight ratio of the binder to the stimulable phosphor =1:20) was prepared, and the viscosity of the coating composition was set at 30 Ps. The thus prepared coating composition was applied with a doctor blade onto a temporary substrate (a polyethylene terephthalate sheet having a thickness of 190 μm, on which a silicone type releasing agent had been applied). The applied coating composition was then dried and separated from the temporary substrate. In this manner, a stimulable phosphor sublayer A1 having a thickness of 180 μm was prepared. Also, in the same manner as that described above, a stimulable phosphor sublayer A2 having a thickness of 205 μm was prepared.

Thereafter, preparations for a substrate were made in the manner described below. Specifically, 56.4 g of a methyl ethyl ketone dispersion of FS-10P [$SnO_2$ (Sb-doped) acicular fine particles (longer axis: 0.2 μm to 2 μu, shorter axis: 0.01 μm to 0.02 μm), supplied by Ishihara Sangyo Kaisha, Ltd.] having a solid content of 30% by weight, and 48 g of methyl ethyl ketone were added to 100 g of a solution containing Vylon 300 (an unsaturated polyester resin, supplied by Toyobo Co., Ltd.) in methyl ethyl ketone and having a solid content of 15% by weight. In this manner, a mixture was prepared, and the viscosity of the mixture was adjusted at approximately 0.2Ps to 0.3Ps. The resulting mixture was applied onto a substrate [a polyethylene terephthalate sheet; Lumirror S-10, 250 μm, haze degree (typical): 27, supplied by Toray Industries, Inc.] such that a thickness might become equal to 3 μm. In this manner, a prime-coating layer was formed on the substrate. Also, 92.5 g of a fluorine type resin [a fluoro olefin-vinyl ether copolymer; Lumiflon LF-504X (30% xylene solution) supplied by Asahi Glass Co., Ltd.], 5 g of a crosslinking agent [a polyisocyanate; Sumidur N3500 (solid content: 100%), supplied by Sumitomo Bayer Urethane K.K.], 0.5 g of a lubricant [alcohol-modified silicone; X-22-2809 (66% xylene-containing paste), supplied by Shin-Etsu Chemical Co., Ltd.], 6.5 g of an organic filler (melamine-formaldehyde; Eposter S6, supplied by Nippon Shokubai Kagaku Kogyo Co., Ltd.), 0.1 g of a coupling agent (acetalkoxy aluminum di-isopropylate; Plenact AL-M, supplied by Ajinomoto Co., Inc.), and 0.35 mg of a catalyst (dibutyltin dilaurate; KS1260, supplied by Kyodo Yakuhin K.K.) were added to 66.5 g of methyl ethyl ketone. The resulting coating composition was adjusted in the same manner as that in the coating composition for the stimulable phosphor sublayers. The thus obtained coating composition was applied onto the surface of the substrate sheet, which surface was opposite to the surface on the prime-coating layer side. In this manner, a coating layer (a bottom protective layer) having a thickness of 2 μm was formed on the substrate.

EXAMPLE B

A stimulable phosphor sublayer B1 having a thickness of 180 μm and a stimulable phosphor sublayer B1 having a thickness of 200 μm were prepared in the same manner as that in Example A, except that a solution containing a polyurethane elastomer (Pandex T-5265H (solid) 469 batch, having a weight-average molecular weight of 135,000, supplied by Dainippon Ink and Chemicals, Inc.) in methyl ethyl ketone and having a solid content concentration of 13% by weight and a viscosity of 2.2Ps was employed as the binder in the coating composition.

In order for the degrees of binder floating in the stimulable phosphor sublayers A1, A2 prepared in Example A and the stimulable phosphor sublayers B1, B2 prepared in Example B to be confirmed, the weight ratio of the binder to the stimulable phosphor at the upper third of each sublayer from the upper surface of the sublayer, which surface was opposite to the temporary substrate contact side surface, was measured. The results shown in Table 1 below were obtained.

TABLE 1

| | Mean binder/phosphor weight ratio at the upper third of the sublayer |
|---|---|
| Example A | 0.070 |
| Example B | 0.085 |

EXAMPLE 1—1

Thereafter, heat compression treatment was performed by use of a calendering machine. Specifically, firstly, the stimulable phosphor sublayer A1 (acting as a lower stimulable phosphor sublayer in this example) was superposed upon the prime-coating layer of the substrate, such that upper surface of the stimulable phosphor sublayer A1, which surface was opposite to the temporary substrate contact side surface of the stimulable phosphor sublayer A1, stands facing the prime-coating layer of the substrate. The combination of the stimulable phosphor sublayer A1 and the substrate was then subjected to heat compression treatment with calendering rolls (metal rolls having a diameter of 200 mm) under the conditions of a total load of 1.6 tons, an upper roll temperature of 45° C., a lower roll temperature of 45° C., and a feed rate of 0.3 m/min. Thereafter, a stimulable phosphor sublayer A1 (acting as an upper stimulable phosphor sublayer in this example) was superposed upon the thus heat-compressed stimulable phosphor sublayer A1, such that the temporary substrate contact side surface of the upper stimulable phosphor sublayer A1 stands facing the upper surface of the heat-compressed stimulable phosphor sublayer A1, which upper surface was the temporary substrate contact side surface of the heat-compressed stimulable phosphor sublayer A1. The combination of the stimulable phosphor sublayers A1, A1 and the substrate was then subjected to heat compression treatment under the conditions of a total load of 2.3 tons, an upper roll temperature of 45° C., a lower roll temperature of 45° C., and a feed rate of 0.3 m/min. with the heat compression treatment, the stimulable phosphor sublayers A1, A1 were completely fused to the substrate via the electrically conductive prime-coating layer, and a stimulable phosphor layer (having a thickness of 287 μm) was thereby formed on the substrate. The filling density of the stimulable phosphor was 3.35 g/cm³.

A coating composition, which was the same as that for the bottom protective layer, was applied onto a 6 μm-thick polyethylene terephthalate film (Lumirror 6c-F53, supplied by Toray Industries, Inc.), and a coating layer having a thickness of 2 μm was thereby formed on the polyethylene terephthalate film. Thereafter, an unsaturated polyester resin solution (Vylon 30SS, supplied by Toyobo Co., Ltd.) was applied onto the surface of the polyethylene terephthalate film, which surface was opposite to the surface provided with the coating layer. The applied unsaturated polyester resin solution was then dried, and an adhesive layer was thereby formed (coating rate of the adhesive agent: 2 g/m²). The thus obtained polyethylene terephthalate film was then adhered to the stimulable phosphor layer via the adhesive layer by use of a laminating roll. An emboss pattern was then formed on the polyethylene terephthalate film. In this manner, a protective layer having a surface roughness of Ra=0.1 μm to 0.2 μwas formed. A radiation image storage panel was thus obtained.

Ten kinds of radiation image storage panels were prepared in Example 1–2 through Example 2—2 and Comparative Example 1—1 through Comparative Example 2—2 basically in the same manner at that in Example 1—1 by employing the stimulable phosphor sublayers A1, A2, which had been prepared in Example A, and the stimulable phosphor sublayers B1, B2, which had been prepared in Example B, as the lower stimulable phosphor sublayer and the upper stimulable phosphor sublayer as listed in Table 2 below.

TABLE 2

| | Lower phosphor sublayer | Upper phosphor sublayer | Film thickness (μm) | Filling density (g/cm³) |
|---|---|---|---|---|
| Ex. 1-1 | A1 | A1 | 287 | 3.41 |
| Ex. 1-2 | A1 | A2 | 302 | 3.40 |
| Ex. 1-3 | A2 | A1 | 299 | 3.39 |
| Ex. 1-4 | A2 | A2 | 316 | 3.38 |
| Ex. 2-1 | B1 | A1 | 284 | 3.41 |
| Ex. 2-2 | B2 | A2 | 314 | 3.38 |
| Comp.Ex. 1-1 | B1 | B2 | 283 | 3.42 |
| Comp.Ex. 1-2 | B2 | B2 | 315 | 3.37 |
| Comp.Ex. 2-1 | A1 | B1 | 284 | 3.41 |
| Comp.Ex. 2-2 | A2 | B2 | 314 | 3.38 |

(1) Evaluation of Graininess Values of a Front Surface Side Image and a Back Surface Side Image Each of the radiation image storage panels obtained in the manner described above was cut to a size of 25 cm×30 cm. As for the thus cut radiation image storage panels, evaluation was made with respect to the outer appearance of the radiation 10 image storage panel, a film thickness difference (=maximum value −minimum value) between the stimulable phosphor sublayers in the radiation image storage panel, and the image quality of an image obtained with the radiation image storage panel. Evaluation of the image quality was made in the manner described below. Specifically, X-rays are produced with a tungsten tube at a tube voltage of 80 kVp, and the X-rays (corresponding to 10 mR) were irradiated to the front surface of the radiation image storage panel. Thereafter, a semiconductor laser beam (stimulating rays) having a wavelength of 660 nm was irradiated to the front surface of the radiation image storage panel. The amount of the stimulating rays was set such that stimulation energy on the surface of the radiation image storage panel was $8J/m^2$. The light, which was emitted from the front surface of the radiation image storage panel when the radiation image storage panel was exposed to the stimulating rays, and the light, which was emitted from the back surface of the radiation image storage panel when the radiation image storage panel was exposed to the stimulating rays, were received with light receivers (photomultipliers having a spectral sensitivity of S-5). The received light was then converted into electric signals. In this manner, a front surface side image and a back surface side image were obtained. With respect to each of the front surface side image and the back surface side image, the Wiener spectrum (frequency-decomposed graininess value, $RMS^2$) at each of 1 cy/mm and 2 cy/mm was measured. The results shown in Table 3 below were obtained.

(2) Evaluation of Adhesion Strength Between Stimulable Phosphor Sublayers

Figure 3:
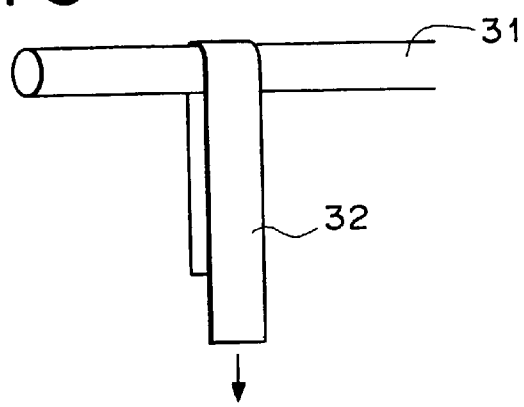
FIG. 3 is an explanatory view showing an evaluating circular cylinder, which is employed for evaluating an adhesion strength between stimulable phosphor sublayers, and a slit piece of a radiation image storage panel.
Figure 4:
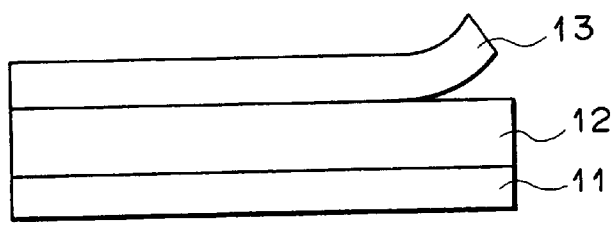
FIG. 4 is an explanatory view showing a state in which a stimulable phosphor sublayer is separated at an interface between stimulable phosphor sublayers.

Evaluation of the adhesion strength between the stimulable phosphor sublayers was made in the manner described below. Specifically, as illustrated in FIG. 3, a panel piece 32 having been cut to a width of 15 mm (length: approximately 300 mm) was squeezed in one direction with a metal circular cylinder 31 (at this time, the substrate side of the panel piece 32 was located to stand facing the circular cylinder 31). Thereafter, as illustrated in FIG. 4, the maximum diameter of the circular cylinder 31, with which separation occurred at the interface between the upper stimulable phosphor sublayer 13 and the lower stimulable phosphor sublayer 12, was measured. The adhesion strength between the stimulable phosphor sublayers was evaluated in accordance with the thus measured maximum diameter of the circular cylinder 31. The results shown in Table 3 were obtained.

TABLE 3

| | Graininess value ($RMS^2$) at 10 mR (all values: ×$10^{-7}$) | | | | Circular cylinder diameter associated with sublayer separation (mm$\phi$) |
|---|---|---|---|---|---|
| | Front surface side image | | Back surface side image | | |
| | 1cy/mm | 2cy/mm | 1cy/mm | 2cy/mm | |
| Ex. 1-1 | 5.98 | 3.30 | 6.73 | 4.88 | 3 |
| Ex. 1-2 | 5.91 | 3.36 | 6.81 | 4.96 | 3 |
| Ex. 1-3 | 6.12 | 3.52 | 7.07 | 5.36 | 3 |
| Ex. 1-4 | 6.15 | 3.47 | 7.18 | 5.53 | 4 |
| Ex. 2-1 | 6.09 | 3.42 | 6.92 | 5.01 | 5 |
| Ex. 2-2 | 6.07 | 3.58 | 7.06 | 5.14 | 5 |
| Comp.Ex. 1-1 | 6.26 | 3.85 | 8.77 | 7.15 | 8 |
| Comp.Ex. 1-2 | 6.33 | 3.88 | 9.08 | 7.33 | 9 |
| Comp.Ex. 2-1 | 6.29 | 3.74 | 7.98 | 6.91 | 6 |
| Comp.Ex. 2-2 | 6.40 | 3.76 | 8.20 | 7.00 | 7 |

As is clear from Table 1 and Table 2, with the radiation image storage panels (Example 1—1 through Example 2—2), wherein the upper stimulable phosphor sublayer contains the polyurethane binder, which has a weight-average molecular weight falling within the range of 200,000 to 500,000, in a proportion falling within the range of 20% by weight to 90% by weight with respect to the total binder contained in the upper stimulable phosphor sublayer, exhibit a markedly smaller circular cylinder diameter associated with separation between stimulable phosphor sublayers than in the Comparative Examples, and have a higher resistance to separation between stimulable phosphor sublayers than in the Comparative Examples. Also, from the results of Example 1–3 and Example 1–4, it can be found that, in cases where the stimulable phosphor sublayer A1 having a small thickness is employed as the upper stimulable phosphor sublayer, the graininess characteristics of the back surface side image are better than those obtained in cases where the stimulable phosphor sublayer A2 having a large thickness is employed as the upper stimulable phosphor sublayer.

In addition, all of the contents of Japanese Patent Application No. 11(1999)-213058 are incorporated into this specification by reference.

What is claimed is:

1. A radiation image storage panel, comprising at least a substrate and a stimulable phosphor layer overlaid upon the substrate, the stimulable phosphor layer being composed of a plurality of stimulable phosphor sublayers overlaid one upon another, wherein at least two stimulable phosphor sublayers, which are adjacent to each other among the plurality of the stimulable phosphor sublayers overlaid one upon another, are overlaid one upon the other such that a temporary substrate contact side surface of one of the two adjacent stimulable phosphor sublayers, which surface was in contact with a temporary substrate utilized when the one adjacent stimulable phosphor sublayer was formed, and a temporary substrate contact side surface of the other adjacent stimulable phosphor sublayer, which surface was in contact with a temporary substrate utilized when the other adjacent stimulable phosphor sublayer was formed, stand facing each other, and wherein a binder, which is contained in a top stimulable phosphor sublayer that is remotest from the substrate among the plurality of the stimulable phosphor sublayers overlaid one upon another on the substrate, contains a polyurethane binder, which has a weight-average molecular weight falling within the range of 200,000 to 500,000, in a proportion falling within the range of 20% by weight to 90% by weight with respect to the total binder contained in the top stimulable phosphor sublayer.

2. A radiation image storage panel as defined in claim 1 wherein the proportion of the polyurethane binder contained in the top stimulable phosphor sublayer falls within the range of 40% by weight to 80% by weight with respect to the total binder contained in the top stimulable phosphor sublayer.

3. A radiation image storage panel as defined in claim 1 wherein sublayer thickness of each of the stimulable phosphor sublayers overlaid one upon another on the substrate is set such that the sublayer thickness of a stimulable phosphor sublayer remote from the substrate is smaller than the sublayer thickness of a stimulable phosphor sublayer close to the substrate.

4. A radiation image storage panel as defined in claim 2 wherein sublayer thickness of each of the stimulable phosphor sublayers overlaid one upon another on the substrate is set such that the sublayer thickness of a stimulable phosphor sublayer remote from the substrate is smaller than the sublayer thickness of a stimulable phosphor sublayer close to the substrate.

5. A radiation image storage panel as defined in claim 1 wherein the radiation image storage panel detects light emitted from opposite surfaces of the radiation image storage panel, thereby detecting two image signals from opposite surfaces of the radiation image storage panel.

6. A radiation image storage panel as defined in claim 2 wherein the radiation image storage panel detects light emitted from opposite surfaces of the radiation image storage panel, thereby detecting two image signals from opposite surfaces of the radiation image storage panel.

7. A radiation image storage panel as defined in claim 3 wherein the radiation image storage panel detects light emitted from opposite surfaces of the radiation image storage panel, thereby detecting two image signals from opposite surfaces of the radiation image storage panel.

8. A radiation image storage panel as defined in claim 4 wherein the radiation image storage panel detects light emitted from opposite surfaces of the radiation image storage panel, thereby detecting two image signals from opposite surfaces of the radiation image storage panel.

* * * * *